(12) United States Patent
Huang

(10) Patent No.: US 12,128,636 B2
(45) Date of Patent: Oct. 29, 2024

(54) SCREEN PROTECTOR PASTING ASSISTING DEVICE FOR AUTOMOBILES

(71) Applicant: Tao Huang, Ningbo (CN)

(72) Inventor: Tao Huang, Ningbo (CN)

( * ) Notice: Subject to any disclaimer, the term of this patent is extended or adjusted under 35 U.S.C. 154(b) by 231 days.

(21) Appl. No.: 17/743,494

(22) Filed: May 13, 2022

(65) Prior Publication Data
US 2022/0274352 A1  Sep. 1, 2022

(30) Foreign Application Priority Data

Nov. 25, 2021  (CN) .......................... 202111449387.5

(51) Int. Cl.
*B29C 65/00* (2006.01)
*B29L 31/58* (2006.01)

(52) U.S. Cl.
CPC .......... *B29C 66/828* (2013.01); *B29C 66/472* (2013.01); *B29L 2031/58* (2013.01)

(58) Field of Classification Search
CPC ..... B29C 66/828; B29C 66/472; B29C 63/02; B29C 63/0047; B29C 2063/0008; B29L 2031/58; G06F 1/1603; G06F 1/1637; B65B 33/02; B65B 67/00
See application file for complete search history.

(56) References Cited

U.S. PATENT DOCUMENTS

| | | |
|---|---|---|
| 2012/0070603 A1 | 3/2012 | Hsu |
| 2015/0227226 A1 | 8/2015 | Wierenga et al. |
| 2017/0222682 A1 | 8/2017 | Liu |
| 2021/0213672 A1* | 7/2021 | Chou .................. B29C 63/0047 |
| 2022/0048816 A1* | 2/2022 | Hofstrand ............... B32B 17/06 |

* cited by examiner

*Primary Examiner* — Christopher W Raimund

(57) ABSTRACT

The present disclosure provides a screen protector pasting assisting device for automobiles, including a body structure, wherein the body structure includes two long edges and two short edges, each of the long edges including a first limit portion, a first sink portion, a second sink portion, a first sink portion, and a first limit portion, one ends of the two first limit portions being respectively connected to the two short edges. The second sink portion is provided with a positioning protrusion. The device features a simple structure and convenient operations, and is suitable for use by a non-professional person in screen protector pasting, thereby achieving a strong practicability.

8 Claims, 7 Drawing Sheets

SCREEN PROTECTOR PASTING ASSISTING DEVICE FOR AUTOMOBILES

TECHNICAL FIELD

The present disclosure relates to the technical field of screen protector pasting for automobiles, and in particular, relates to a screen protector pasting assisting device for automobiles.

BACKGROUND

Automotive screens are as easily scratched as other electronic product screens, thereby seriously affecting a display effect and aesthetics of electronic screens. In order to avoid scratches, a screen protector may be applied to the screen, and if no assisting tool is provided, the screen protector may be easily biased or subject to bubbles and dirt.

A conventional screen protector pasting assisting device, by using a frame panel, frames a screen protector and slides with fingers and presses the screen film to adhere to the screen within a well-limited position range, such that the screen protector is at a correct position of the screen, for example, as disclosed in Patent Document CN108688864A. However, the operations in this way are relatively complicated, and when the panel of the assisting device covers the screen, it is not easy to observe air bubbles generated during a pasting process of the screen protector. Some fully automatic film pasting devices are also proposed in the related art, for example, as disclosed in Patent Document CN214493471U and CN108673873A. However, the above-mentioned devices have the disadvantages of complicated structure and inconvenient use, which are not conducive to the use of non-professional persons.

SUMMARY

In view of the defects in the related art, the present disclosure is intended to provide a screen protector pasting assisting device for automobiles. The device features a simple structure and convenient operations, and a screen protector may be accurately fixed. In a pasting process, observation is eased, fewer bubbles are caused, and the pasting is airtight.

To achieve the above objective, the present disclosure employs the following technical solutions:

A screen protector pasting assisting device for automobiles includes a body structure, wherein the body structure is a hollow rectangular and symmetric structure, and the body structure includes two long edges and two short edges, each of the long edges including a first limit portion, a first sink portion, a second sink portion, a first sink portion, and a first limit portion, one ends of the two first limit portions being respectively connected to the two short edges; wherein the second sink portion is provided with a positioning protrusion; and the two short edges are respectively connected to a left handle and a right handle.

Preferably, an upper surface of the first sink portion is lower than an upper surface of the first limit portion, and an upper surface of the second sink portion is lower than an upper surface of the first sink portion.

Preferably, a lower surface of the first sink portion is in flush with a lower of the second sink portion, and is higher than a lower surface of the first limit portion.

Preferably, the first sink portion and the second sink portion have an equal width and two edges that are in flush with each other, and the first limit portion has a width greater than that of the first sink portion.

Preferably, one edge of the first limit portion is inn flush with the first limit portion to limit the screen protector.

Preferably, the left handle and the right handle are respectively connected to the two short edges.

Preferably, the left handle and the right handle are asymmetrically disposed.

Preferably, the left handle is in an extended arc shape to prevent the screen protector device from colliding with a wiper switch.

Preferably, the positioning protrusion includes a circular positioning protrusion and a racetrack-shaped positioning protrusion.

Preferably, the short edge includes a tempered screen protector limit side wall, the tempered screen protector limit side wall being positioned on an inner side of the device on the short edge, and a lower surface of the tempered screen protector side wall being in flush with a lower surface of the first limit portion to limit the screen protector.

Compared with the related art, the present disclosure achieves the following beneficial effects:

(1) The screen protector pasting assisting device according to the present disclosure features a simple structure and convenient operations. The screen protector is positioned and fixed by the protrusion, and the screen protector may be securely positioned by four corners, formed inside a frame body. The device is suitable for use by a non-professional person in screen protector pasting. In a pasting process, the screen protector is accurately fixed, observation is eased, and fewer bubbles are caused.

(2) The screen protector pasting assisting device according to the present disclosure employs a hollow frame structure. A space facilitating user's operations is provided while materials are saved, and hence a better use effect is achieved.

(3) The screen protector pasting assisting device according to the present disclosure provides positioning protrusions on upper and lower sides, such that the screen protector is conveniently fixed to the device, with no need to further fix the screen protector with an adhesive tape. A secondary sink structure is disposed on both the upper and lower sides, such that the frame body exerts a downward action force against the screen protector during mounting, and the screen protector is more tightly pasted. In addition, the positioning protrusions disposed on the upper and lower sides of the device fix the screen protector, such that the screen protector installed thereon is subject to a longitudinal tensile effect, thereby reducing deformations caused by gravity during mounting. In this way, the screen protector is more flatly installed on the screen, and thus occurrence of bubbles is mitigated.

(4) The two handles according to the present disclosure are asymmetrically designed, which helps the user to better apply a force. A wiper switch of the automobile is positioned on a left side of the screen, an internally-beveled shape (an extended arc shape) in a lower direction on a left side of the handle of the device may avoid the wiper switch, thereby preventing inconvenience caused by collisions in use.

(5) According to the present disclosure, the first sink portion and the second sink portion have a thickness (a relative height) less than that of the other parts on the long edges, such that the two positioning bars are more elastic, and deformations may be caused when the positioning bars are pressed. After the screen protector is installed on the screen, the two positioning bars may be slightly pressed to cause the screen protector to be better pasted onto the screen.

BRIEF DESCRIPTION OF HE DRAWINGS

Figure 1:
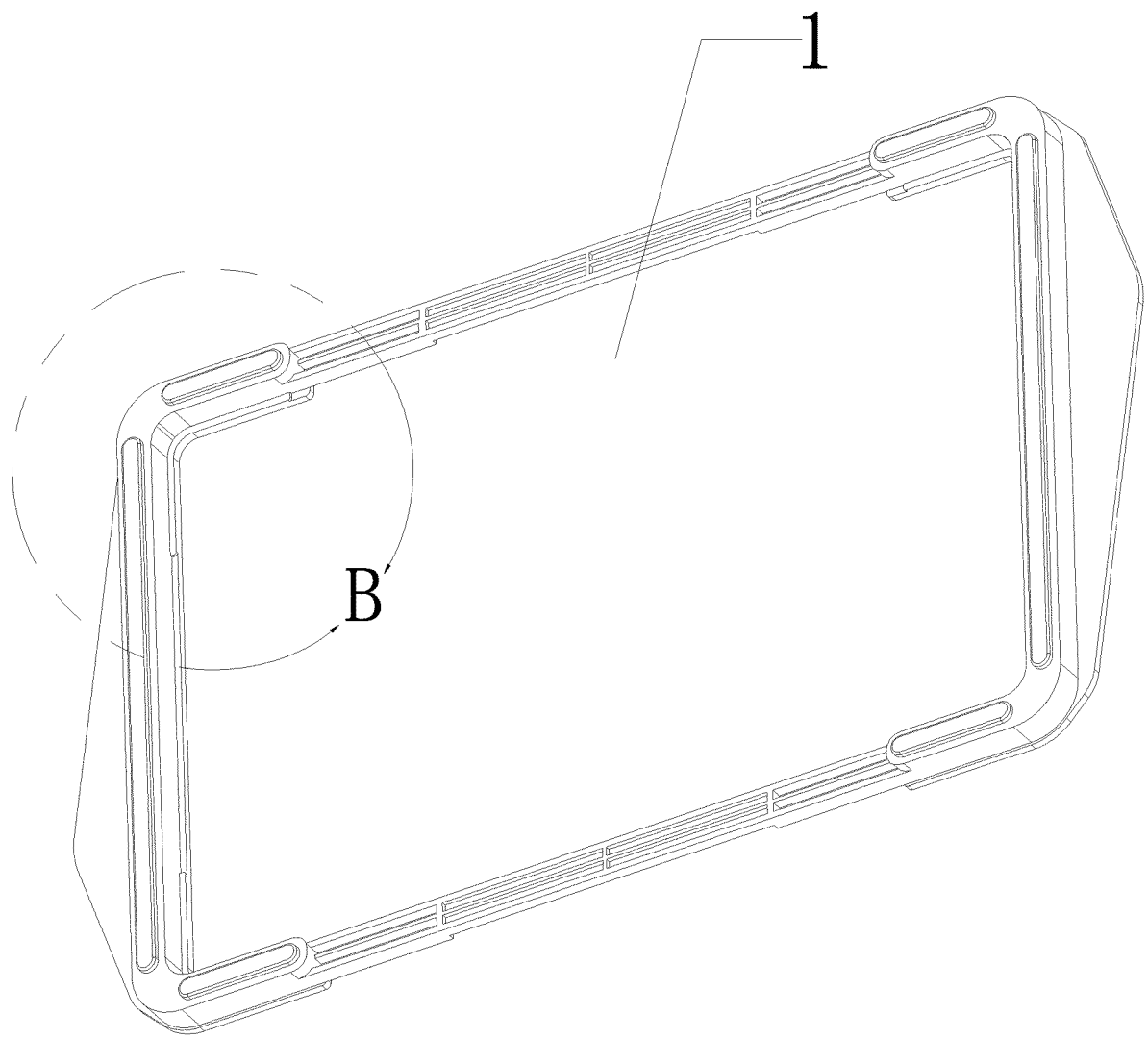
FIG. 1 is a schematic structural view of a body structure of a screen protector pasting assisting device according to the present disclosure.
Figure 2:
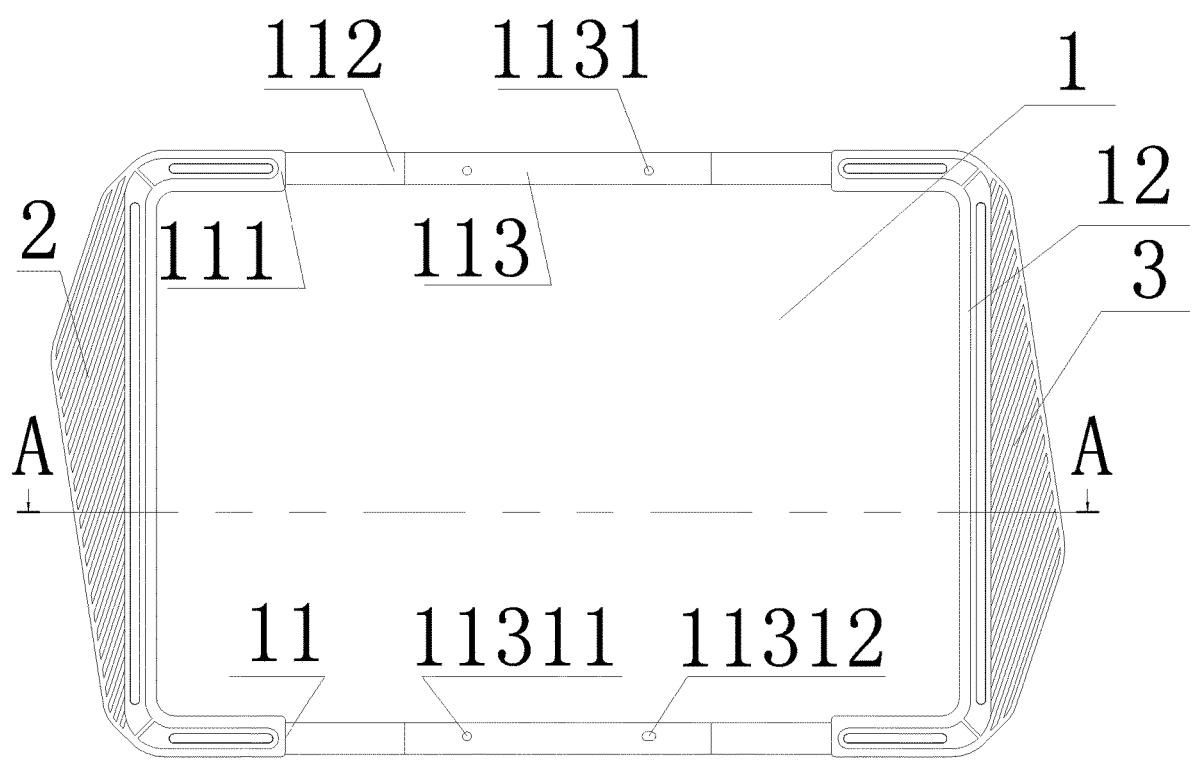
FIG. 2 is a schematic top view of the screen protector pasting assisting device when being horizontally placed according to the present disclosure.
Figure 3:
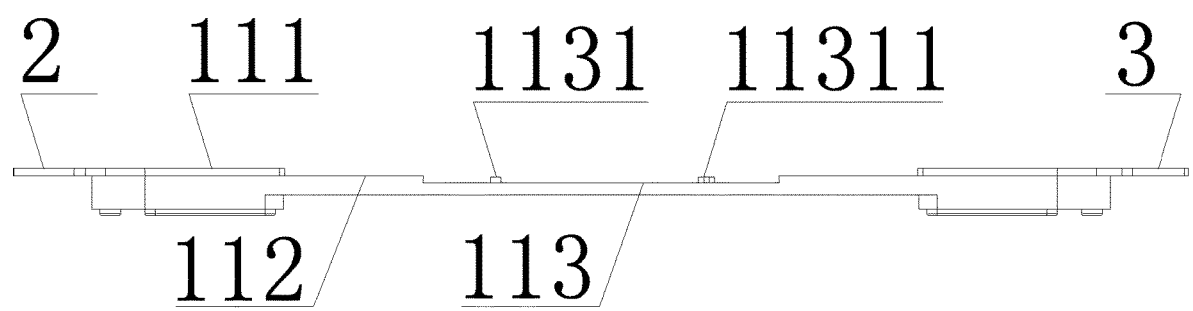
FIG. 3 is a schematic plan view of the screen protector pasting assisting device when being horizontally placed according to the present disclosure.
Figure 4:
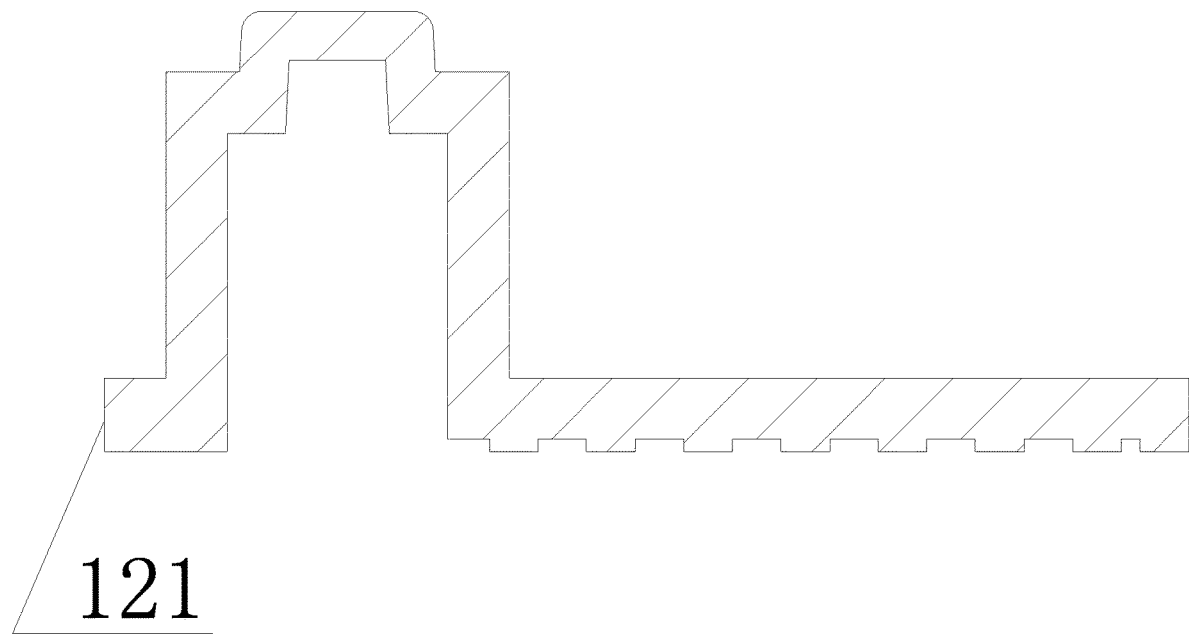
FIG. 4 is a schematic perspective view of a left handle at a A side of the screen protector pasting assisting device when being horizontally placed according to the present disclosure.
Figure 5:
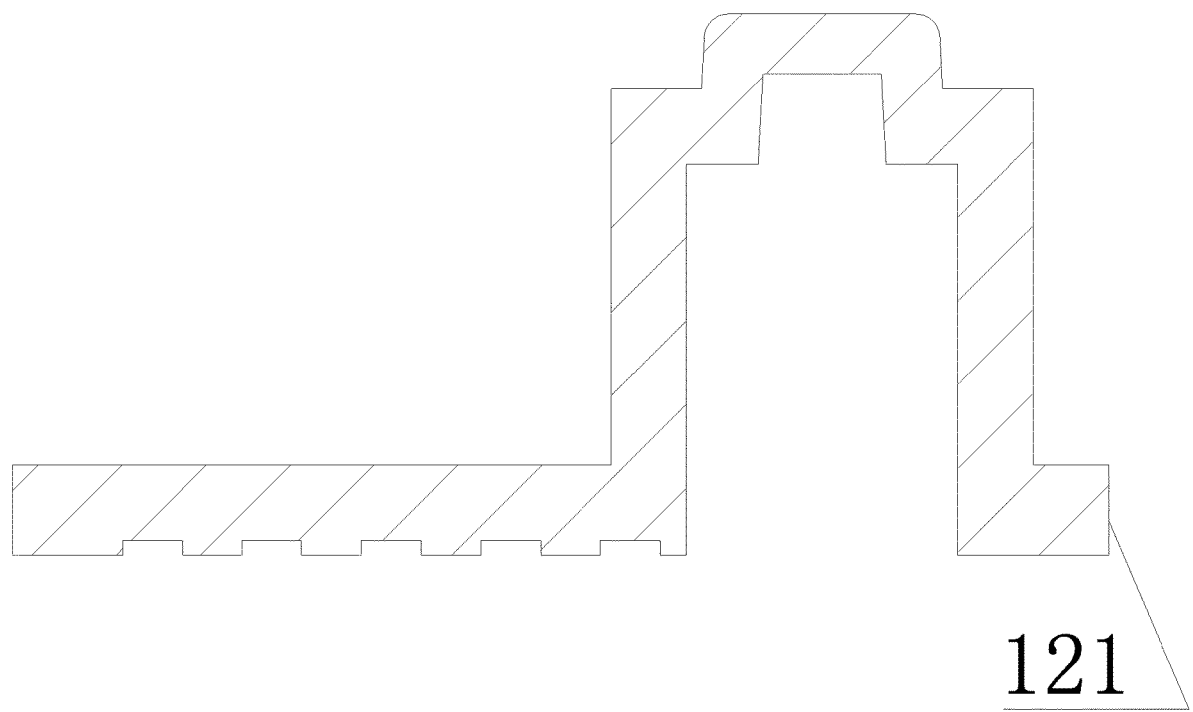
FIG. 5 is a schematic perspective view of a right handle at a A side of the screen protector pasting assisting device when being horizontally placed according to the present disclosure.
Figure 6:
FIG. 6 is a schematic enlarged structural view of a B part of the screen protector pasting assisting device according to the present disclosure.

Reference numerals and denotations thereof: 1—body structure; 11—long edge; 12—short edge; 11—first limit portion; 112—first sink portion; 113—second sink portion; 1131—positioning protrusion; 11311—circular positioning protrusion; 11312—racetrack-shaped positioning protrusion; 121—tempered screen protector limit side wall; 2—left handle; 3—right handle; 4—inner side protector film; 5—screen protector; and 6—outer side protector film.

DETAILED DESCRIPTION

For clearer descriptions of the objective, technical solutions, and advantages of the present disclosure, the present disclosure is further described with reference to the accompanying drawings.

First Embodiment

Referring to FIG. 1 to FIG. 7, a screen protector pasting assisting device for automobiles includes a body structure 1, wherein the body structure 1 is a hollow rectangular and symmetric structure, and the body structure 1 includes two long edges 11 and two short edges 12, each of the long edges 11 including a first limit portion 111, a first sink portion 112, a second sink portion 113, a first sink portion 112, and a first limit portion 111, one ends of the two first limit portions 111 being respectively connected to the two short edges 12.

The second sink portion 113 is provided with a positioning protrusion 1131. With such a configuration, small openings in an outer side protector film 6 are connected to the positioning protrusion, and hence the screen protector is fixed, and a convenient use is achieved.

The two short edges 12 are respectively connected to a left handle 2 and a right handle 3.

As a further improvement of the embodiment of the present disclosure, an upper surface of the first sink portion 112 is lower than an upper surface of the first limit portion 111, and an upper surface of the second sink portion 113 is lower than an upper surface of the first sink portion 112. As a further improvement of the embodiment of the present disclosure, a lower surface of the first sink portion 112 is in flush with a lower of the second sink portion 113, and is higher than a lower surface of the first limit portion 111, With such a configuration, a secondary sink configuration may be formed, such that the screen protector is securely pasted. In addition, a convex structure may be formed and hence a negative distance is formed, such that the screen protector pasting assisting, device is better fixed to the screen of the automobile.

As a further improvement of the embodiment of the present disclosure, the first sink portion 112 and the second sink portion 113 have an equal width and two edges that are in flush with each other, and the first limit portion 111 has a width greater than that of the first sink portion 112. As a further improvement of the embodiment of the present disclosure, wherein one edge of the first limit portion 111 is in flush with the first limit portion 111. That is, the first limit portion 111 extends towards an inner side of the device relative to the first sink portion 112, By connection between the long edges and the short edges, four corners may be formed inside the screen protector pasting assisting device.

As a further improvement of the embodiment of the present disclosure, the left handle 2 and the right handle 3 are respectively connected to the two short edges 12.

As a further improvement of the embodiment of the present disclosure, the left handle 2 and the right handle 3 are asymmetrically disposed. With such a configuration, a user may better grip the device.

As a further improvement of the embodiment of the present disclosure, the right handle 2 is in an extended arc shape. A wiper switch of the automobile is positioned on a left side of the screen, an internally-beveled shape (an extended arc shape) in a lower direction on a left side of the handle of the device may avoid the wiper switch, thereby preventing inconvenience caused by collisions in use.

As a further improvement of the embodiment of the present invention, the positioning protrusion 1131 includes a circular positioning protrusion 11311 and a racetrack-shaped positioning protrusion 11312, wherein both of the circular or racetrack-shaped positioning protrusions both achieve a fixing function. The number of the racetrack-shaped positioning protrusions is one, to prevent a situation where front and rear sides of the screen protector are reversed in mounting of the screen protector are, i.e., a distinguishing function is achieved.

As a further improvement of the embodiment of the present invention, the short edge 12 includes a tempered screen protector limit side wall 121. The tempered screen protector limit side wall 121 is disposed on an inner side of the device on the short edge 12. A lower surface of tempered screen protector limit side wall 121 is flush with a lower surface of the first limit portion 111. A height of the tempered screen protector limit side wall 121 is maintained equal to a height of a bottom edge inside the device on the first limiting portion 111, such that the two are connected to form an entirety, which limits the screen protector at is formed at four inner corners of the screen protector pasting assisting device.

It should be noted that the screen protector pasting assisting device according to the present disclosure may be integrally formed and the manufacturing process is simple, which are both related arts; and the present disclosure does not describe a preparation process of the device, which can be easily achieved by a person skilled in the art. Meanwhile, in the screen protector pasting assisting device according to the present disclosure, design of the short sides and the long sides may be flexibly selected. For example, openings are formed in the short sides and the long sides to increase the aesthetics. For example, the short sides and the long sides can be formed in a solid structure or a hollow structure. The present disclosure does not specifically define and describe these technical details.

Figure 7:
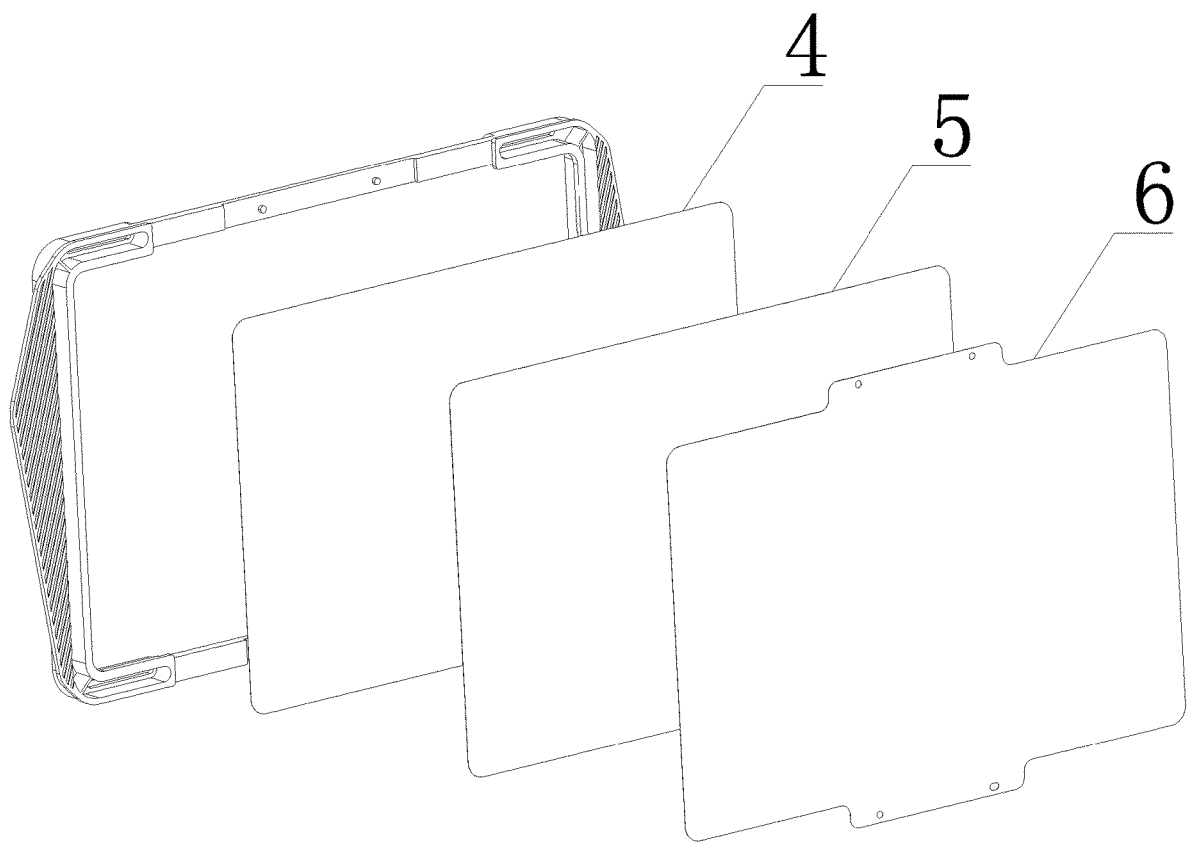
FIG. 7 is a schematic view of separation of a screen protector and the screen protector pasting assisting device according to the present disclosure.

In addition, it should be noted that the structure of the screen protector is as shown in FIG. 7, which matches the specification of the screen protector pasting assisting device according to the present disclosure, and the outer side protector film is provided with a small opening matching the positioning protrusion. The present disclosure does not specifically protect and describe the above-mentioned technical solution.

Principle of use of the screen protector pasting assisting device according to the present disclosure: The screen protector for the automobile to be pasted is fixed to the upper and lower positioning protrusions of the screen protector pasting assisting device, and then an inner side protective film 4 is torn off; a user holds two side handles of the device, fixes the screen protector pasting assisting device at the position where the outer side of the screen of the automobile faces upwards, positions the screen using the four top corners formed in the frame body by connecting the short sides and the long sides, and mounting the screen protector pasting assisting device on the screen; subsequently, the user pastes the screen protector to the screen by sliding and pressing on the outer side of the screen protector, to ensure that no bubbles are caused and the pasting is airtight; and after the screen protector is applied, an outer side protector film 6 is peeled off and only a screen protector 5 remains.

The above embodiments are merely given for illustration of the technical concepts and characteristics of the present disclosure, and are intended to better help persons skilled in the all to understand the content of the present disclosure and practice the technical solutions according to the present disclosure. However, these embodiments are not intended to limit the protection scope of the present disclosure. Any equivalent variations or modifications derived without departing from the spirit and essence of the present disclosure shall be considered as falling within the protection scope of the present disclosure.

What is claimed is:

1. A screen protector pasting assisting device for automobiles, comprising a body structure, wherein the body structure is a hollow rectangular and symmetric structure, and the body structure comprises two long edges and two short edges, each of the long edges comprises two first limit portions, two first sink portions and one second sink portion, one ends of the two first limit portions are respectively connected to the two short edges, the other ends of the two first limit portions are respectively connected to the two first sink portions, and both ends of the second sink portion are also respectively connected to the two first sink portions;

the second sink portion is provided with a positioning protrusion; and the two short edges are respectively connected to a left handle and a right handle;

the two first sink portions respectively have the same width as the second sink portion and are flush on both sides, and widths of the two first limit portions are greater than that of each of the two first sink portions respectively; and the two first limit portions are respectively flush with each of the two first sink portions on one side outside the device.

2. The screen protector pasting assisting device for automobiles according to claim 1, wherein an upper surface of the first sink portion is lower than an upper surface of the first limit portion, and an upper surface of the second sink portion is lower than an upper surface of the first sink portion.

3. The screen protector pasting assisting device for automobiles according to claim 1, wherein a lower surface of the first sink portion is flush with a lower surface of the second sink portion, and is higher than a lower surface of the first limit portion.

4. The screen protector pasting assisting device for automobiles according to claim 1, wherein the left handle and the right handle are respectively connected to the two short edges.

5. The screen protector pasting assisting device for automobiles according to claim 1, wherein the left handle and the right handle are asymmetrically disposed.

6. The screen protector pasting assisting device for automobiles according to claim 1, wherein a lower portion of the left handle is in an inwardly beveled shape.

7. The screen protector pasting assisting device for automobiles according to claim 1, wherein the positioning protrusion comprises a circular positioning protrusion and a racetrack-shaped positioning protrusion.

8. The screen protector pasting assisting device for automobiles according to claim 1, wherein at least one of the short edges comprises a tempered screen protector limit side wall, the tempered screen protector side wall is positioned on an inner side of the device on the short edge, and a lower surface of the tempered screen protector side wall is flush with a lower surface of the first limit portion.

* * * * *